United States Patent [19]

McShane

[11] Patent Number: 5,121,639

[45] Date of Patent: Jun. 16, 1992

[54] FLUID FLOW MEASUREMENT

[75] Inventor: James L. McShane, Churchill, Pa.

[73] Assignee: Westinghouse Electric Corp., Pittsburgh, Pa.

[21] Appl. No.: 489,133

[22] Filed: Mar. 5, 1990

[51] Int. Cl.$^5$ .................... G01F 1/712; G01F 1/66
[52] U.S. Cl. ....................... 73/861.06; 73/195; 73/861.18
[58] Field of Search ............... 73/195, 861.04, 861.08, 73/861.18, 861.06

[56] References Cited

U.S. PATENT DOCUMENTS

| | | |
|---|---|---|
| 3,680,375 | 8/1972 | Joy et al. |
| 3,886,794 | 6/1975 | McShane |
| 4,201,083 | 5/1980 | Kurita et al. ............... 73/861.06 |
| 4,519,257 | 5/1985 | Simpkins ............... 73/861.04 |
| 4,528,857 | 7/1985 | Bruner ............... 73/861.18 |

FOREIGN PATENT DOCUMENTS 2066466  7/1981  United Kingdom ............ 73/861.18

Primary Examiner—Herbert Goldstein
Attorney, Agent, or Firm—Z. L. Dermer

[57] ABSTRACT

A method and apparatus for monitoring the velocity of flow of a fluid, by: causing fluid to flow through a conduit section defining a monitoring region, the conduit section having an interior defining a flow path which is free of any physical obstruction that can significantly influence fluid flow in the monitoring region; propagating a beam of energy across the flow path in the monitoring region in a direction transverse to the flow path, the energy being selected such that the beam is modulated by turbulence occurring in the fluid; detecting the modulated beam at a single location in the monitoring region after the beam has traversed the flow path and generating a single electrical signal representative of the detected modulated beam; and processing the single electrical signal in a manner to provide an indication of the modulation of the beam produced by the turbulence in the fluid.

14 Claims, 2 Drawing Sheets

FLUID FLOW MEASUREMENT

BACKGROUND OF THE INVENTION

The present invention is directed to the measurement of fluid flow in a conduit, particularly by detection and measurement of energy directed through the fluid.

It is known in the art to monitor fluid flow through a conduit by detecting and measuring a beam of, e.g., ultrasonic, energy traversing the fluid. One known technique of this type involves the disposition of an obstruction in the flow path upstream of the path of an ultrasonic beam through the fluid. The obstruction produces vortices having a fixed mutual spacing, regardless of fluid flow velocity, so that the frequency with which such vortices pass through an ultrasonic beam will be indicative of flow velocity. Measurement devices utilizing this principle are disclosed, for example, in U.S. Pat. Nos. 3,680,375; 3,881,352; and 3,886,794.

It will be appreciated that implementation of this technique requires the installation of an obstructing device, such as a vortex strut, in the fluid stream and when the fluid to be monitored is flowing in a conduit, installation of the strut entails added manufacturing costs or retrofitting costs if flow measurement equipment is to be installed in an existing system. It is also known to monitor fluid flow in a conduit, utilizing ultrasonic energy, without the aid of an obstruction or strut, by causing two ultrasonic beams to traverse the conduit at locations which are spaced apart along the direction of fluid flow. The two ultrasonic signals produced with this arrangement are appropriately conditioned and supplied to a cross-correlator which processes the signals in a manner to produce the desired fluid velocity indication. While such a device produces accurate results, the cross-correlation procedure requires a substantial period of time, so that significant delays exist between a change in flow rate and the production of an indication of such change.

SUMMARY OF THE INVENTION

It is a primary object of the present invention to monitor fluid flow in a manner which produces a fast response and which does not require any obstruction of the flow path.

Another object of the invention is to perform such monitoring operation with simple and inexpensive circuitry.

A further object of the invention is to impart fast response characteristics to a monitoring system employing cross-correlation.

The above and other objects are achieved, according to the present invention, by a method and apparatus for monitoring the velocity of flow of a fluid by causing fluid to flow through a conduit section defining a monitoring region, the conduit section having an interior defining a flow path which is free of any physical obstruction that can significantly influence fluid flow in the monitoring region, propagating a beam of energy across the flow path in the monitoring region in a direction transverse to the flow path, the energy being selected such that the beam is modulated by turbulence occurring in the fluid, detecting the modulated beam at a single location in the monitoring region after the beam has traversed the flow path and generating a single electrical signal representative of the detected modulated beam, and processing the single electrical signal in a manner to provide an indication of the modulation of the beam produced by the turbulence in the fluid.

The flow monitoring method and apparatus according to the present invention make use of applicant's discovery that the inherent, or naturally occurring, flow turbulence of a fluid flowing through an unobstructed conduit, even if that conduit has very smooth walls, can modulate an ultrasonic beam in such a manner as to produce flow velocity information. In particular, applicant has discovered that naturally occurring flow turbulence will vary both the magnitude and the frequency of such modulation in a manner directly, but not necessarily linearly, related to the flow velocity. Thus, the peak-to-peak, rms, or rectified average value of the magnitude of such modulation, or the frequency content of the modulation, can be directly monitored to provide an immediate useful indication of instantaneous flow velocity. When the term frequency is employed hereinafter with reference to the modulation produced by fluid turbulence, this is to be understood as a reference to frequency content, i.e., one or more components of the signal frequency spectrum.

Alternatively, since flow turbulence causes fluctuations in the velocity of various forms of energy traversing the fluid, including ultrasonic energy, an instantaneous flow velocity indication can be obtained, according to the invention, by monitoring fluctuations in phase of the energy. This can be achieved, for example, by supplying the modulated signal and a signal representative of the unmodulated energy to a device whose output is essentially proportional to the phase difference between the two signals.

According to a further aspect of the present invention, one of the monitoring techniques described above is combined with cross-correlation monitoring to provide an output signal which responds rapidly to variations in flow velocity while retaining the inherent accuracy of the cross-correlation technique.

DESCRIPTION OF THE PREFERRED EMBODIMENTS

Figure 1:
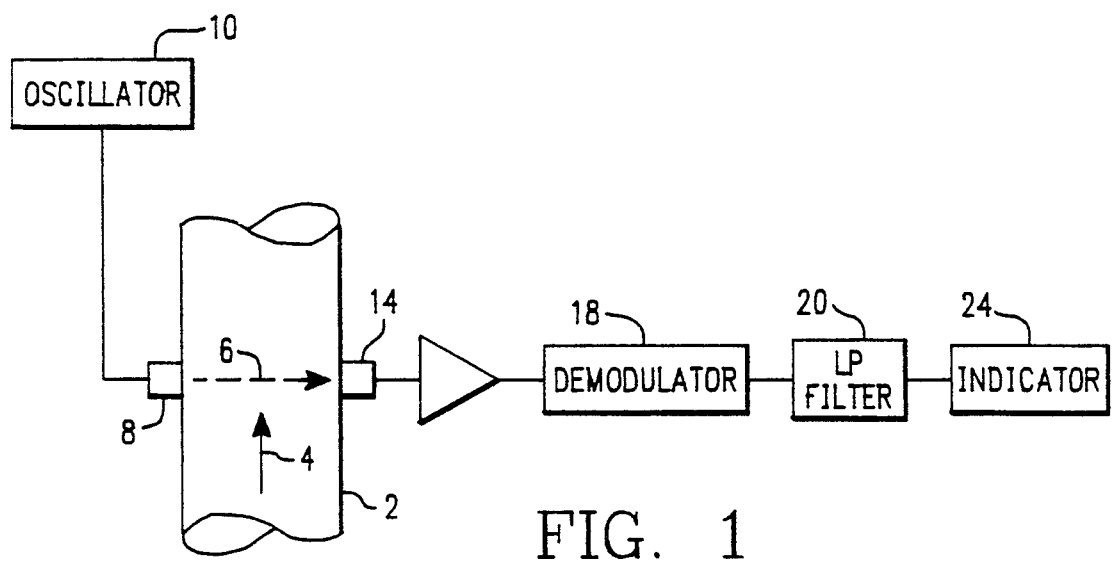
FIG. 1 is a block diagram of a simple embodiment of a system for monitoring flow velocity according to the present invention.

FIG. 1 illustrates a first embodiment of a system for implementing the invention, which has been selected because of its structural simplicity and ability to be implemented with conventional, inexpensive circuit devices.

Fluid flowing through a conduit 2 in the direction indicated by arrow 4 is traversed by a directed ultrasonic energy beam 6 produced by an ultrasonic energy transmitting transducer 8 driven by an oscillator 10 that preferably produces an output signal having a fixed amplitude and frequency. The sonic energy in beam 6 is received by a receiving transducer 14 which, in the illustrated embodiment, is disposed directly in the path along which beam 6 is emitted from transmitting transducer 8.

Any turbulence in the fluid flowing through conduit 2 will act to vary both the velocity and direction of beam 6. Fluctuations in beam velocity will impose a phase modulation on the ultrasonic energy and fluctuations in beam direction will impose an amplitude modulation on the ultrasonic energy reaching receiving transducer 14. In the illustrated embodiment, where receiving transducer 14 is located in the original path of beam 6, deflections of the beam will reduce the intensity of ultrasonic energy reaching transducer 14. As is known in the art, transducer 14 could be disposed at a location spaced laterally from the normal path of beam 6, in which case deflections experienced by the beam will act to increase the ultrasonic energy received by transducer 14.

The output signal from transducer 14, constituting the transducer's response to the original ultrasonic beam with amplitude and phase, i.e., velocity, modulations imposed thereon, is supplied, via an amplifier having a suitably selected gain, to a simple demodulator 18 which may be constituted, for example, by a diode square-law demodulator, or detector. In order to block transmission of spurious signal components caused by vibration of the structure associated with the conduit, a simple high pass filter is placed in the signal path between transducer 14 and the amplifier. This filter can be considered to be part of the transducer termination and has a cutoff frequency which is sufficiently below the frequency of the signal emitted by transducer 8 to allow passage of the lower sideband produced by the modulation.

The signal provided by demodulator 18 is supplied to a lowpass filter 20 having a characteristic selected to suppress signal components representing the unmodulated frequency of the ultrasonic energy, corresponding to the frequency of the signal produced by oscillator 10. In systems of the type contemplated by the invention, the frequency of the signal produced by oscillator 10 will be substantially higher than the frequency of the modulation produced by turbulence in the fluid flowing through conduit 2. Thus, the output signal from filter 20 contains essentially the modulation components produced by that fluid. This output signal has a magnitude and frequency representative of the amplitude modulation imposed on the ultrasonic energy by turbulence in the fluid flowing through conduit 2. This signal has both a time varying peak magnitude and a frequency characteristic, either of which can be measured by a suitable indicator 24 to provide an output signal indicative of the degree of turbulence in the fluid flowing through conduit 2, and thus the velocity of that fluid. Therefore, indicator 24 may be a device which provides an indication of the peak, rectified average, or rms magnitude of the output signal from filter 20 or it may be a frequency indicator which is responsive to the frequency characteristic of that output signal.

Figure 2:
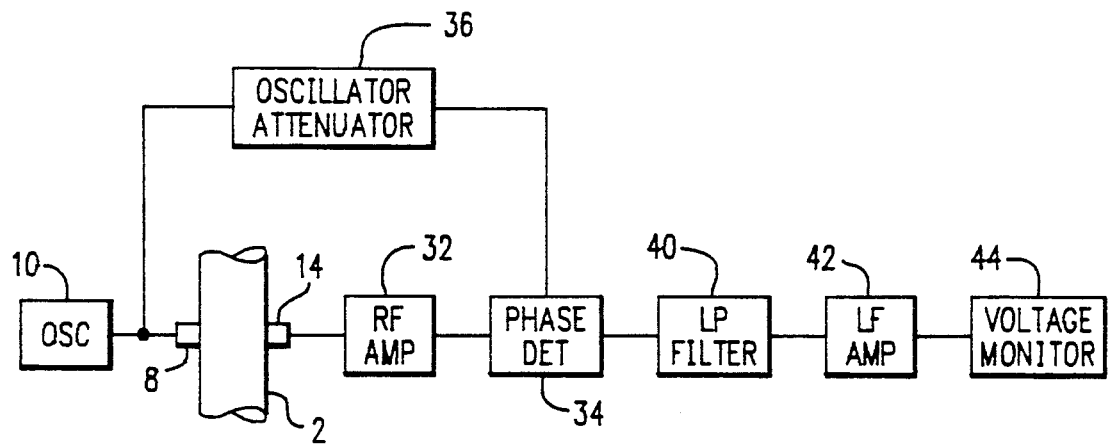
FIG. 2 is a block diagram illustrating a further embodiment of a system for implementing the present invention.

A second embodiment of a circuit for implementing the invention is shown in FIG. 2 and is constructed to measure fluid flow on the basis of phase variations induced in the ultrasonic signal produced by transducer 8 by turbulence in the flowing fluid. In this embodiment, the output signal from receiving transducer 14 is supplied via an RF amplifier 32 having an adjustable gain to one input of a phase detector 34. The other input of phase detector 34 is connected to receive the signal produced by oscillator 10 via an oscillator attenuator 36 which adjusts the oscillator output signal to the optimum level for application to phase detector 34.

The output signal from phase detector 34 varies in magnitude and frequency as a function of fluctuations in the phase of the output signal from transducer 14 relative to the phase of the oscillations produced by oscillator 10.

The output signal from phase detector 34 is conducted through a lowpass filter 40 which filters out components at the frequency of oscillator 10 and significant harmonics of that frequency. The resulting output signal is then conducted via a low frequency amplifier 42 to a voltage monitor 44 which provides an output reading or signal indicative of the magnitude of the output signal produced by phase detector 34. Monitor 44 can be any suitable type of voltmeter capable of providing a peak-to-peak, rms, or rectified average voltage value indication, or a voltage monitoring circuit providing an output signal representative of one of those values.

In a variation of the embodiment illustrated in FIG. 2, monitor 44 can be an electronic counter which produces a reading indicative of the frequency of the output signal from phase detector 34. The average zero crossing frequency of a clipped signal can for example be used as the output.

In tests, both the rms magnitude and the frequency of the output signal from phase detector 34 were found to increase with increased flow velocity. The rms voltage was seen to vary essentially linearly, while some nonlinearity was seen in the frequency variation.

Figure 3:
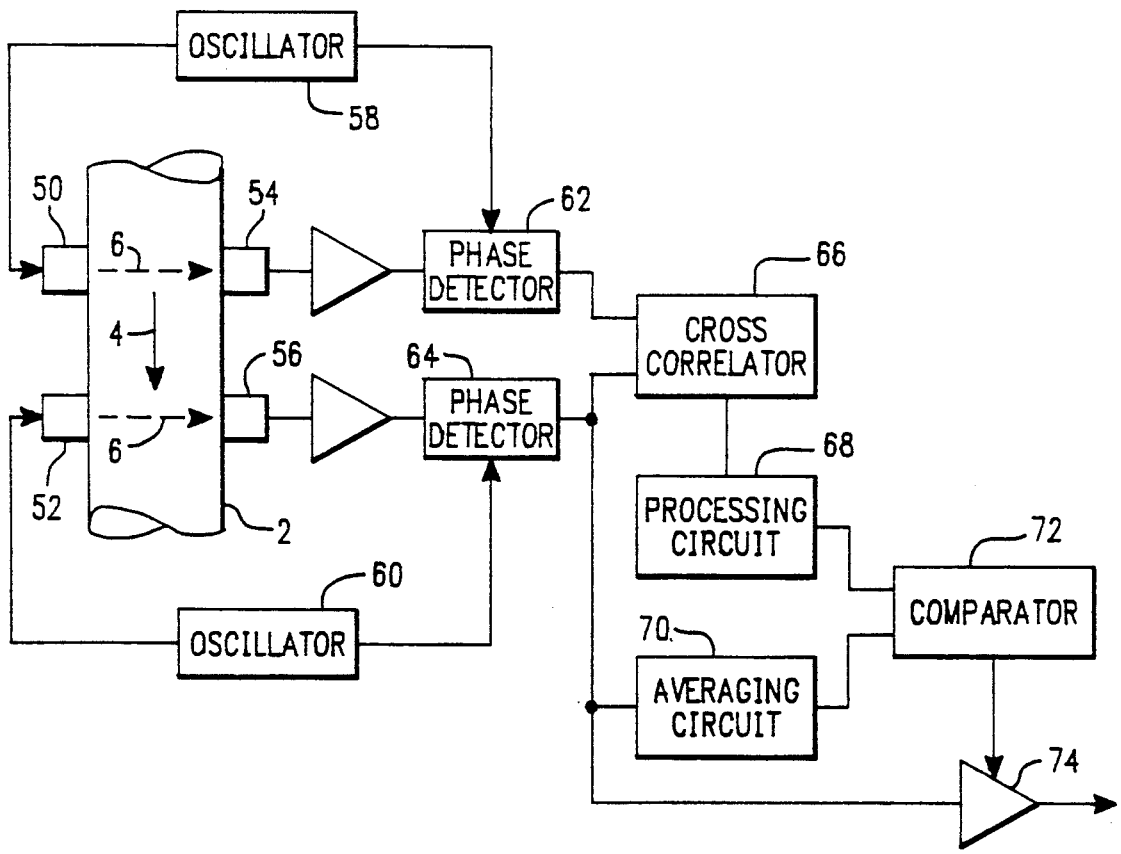
FIG. 3 is a block diagram illustrating a system for monitoring flow velocity according to the present invention in combination with a cross-correlation system.

FIG. 3 illustrates an embodiment of the present invention combined with a conventional cross-correlation flow meter to produce an output signal having the fast response characterizing the invention and the accuracy characterizing cross-correlation devices. The system includes conventional cross-correlation components which include two ultrasonic signal units, each unit including a transmitting transducer 50, 52, a receiving transducer 54, 56, and an oscillator 58, 60, each oscillator being connected to a respective transmitting transducer.

Each receiving transducer 54, 56 is connected to the input of a respective phase detector 62, 64 whose outputs are supplied to a cross-correlator 66. Conventional cross-correlators provide a peak output having a time delay between correlator input signals which correspond to the transit time of fluid between sensing locations. This output is supplied to a suitable processing circuit 68 which senses the peak output and produces a DC signal proportional to the fluid velocity represented by the measured time delay.

According to the invention, the output of one of the phase detectors 62, 64, the rms value of which is representative of the degree of turbulence in the flowing fluid and is responsive to short-time turbulence variations, is applied to an averaging circuit 70 which produces a DC output signal corresponding in scale with the signal from circuit 68. The two DC signals are applied to a comparator 72, while the output of phase detector 64 is additionally supplied to the signal input of an electronically controllable variable gain amplifier 74. The gain control input of amplifier 74 is connected to the output of comparator 72 so that the rms value of the output signal from amplifier 74 will correspond to the fast response output signal from phase detector 64, corrected for any differences between the average value of the fast response signal provided by averaging circuit 70 and the more accurate, slower response output signal from circuit 68. The output signal from amplifier 74 can then be supplied to a suitable indicating device, such an rms-reading voltmeter or digital voltmeter.

If the frequency of the output signal from phase detector 64 is to be employed to provide a flow velocity indication, a circuit arrangement composed of a frequency detector and a frequency-to-voltage converter could be interposed in the line between phase detector 64 and averaging circuit 70.

A system of the type illustrated in FIG. 3 could also be employed to monitor variations in the magnitude of the modulation imposed on the ultrasonic signal by flow turbulence by replacing each phase detector 62, 64 by a circuit arrangement composed of devices 18 and 20 of FIG. 1, in which case oscillators 58 and 60 would not be connected to these demodulators.

In general, it would be appropriate to sense the magnitude of the modulation produced by flow turbulence for sensing gas flow and to utilize phase detection for sensing liquid flow.

In systems according to the present invention, the ultrasonic signal supplied by oscillator 10, or oscillators 58 and 60, could have a frequency in the range of 50 KHz to 500 KHz for use in sensing gas flows, and a frequency in the range of 1–10 MHz for use with liquid flows. In each case, better results are obtained at frequencies near the upper end of the stated range since this permits the use of smaller transducers, avoids standing waves, and results in narrower ultrasonic energy beams.

When phase detection is to be employed, use could be made of commercially available double balanced mixers.

When a system according to the invention is used alone to provide fast response flow velocity indications, the system should be calibrated periodically, particularly when the fluid being monitored is subject to variations in temperature, pressure or composition.

In an experimental system according to the invention used to monitor water flow and having the form shown in FIG. 2, using an HP 3400 RMS voltmeter 44, an oscillator frequency of 5 MHz, and a conduit 2 made of PVC and having a diameter of 3.1 cm, the rms value of the phase detected modulation voltage was found to vary linearly between approximately 0 and 0.4 volt for a water flow rate variation between 0 and 0.087 m$^3$ per minute.

Figure 4:
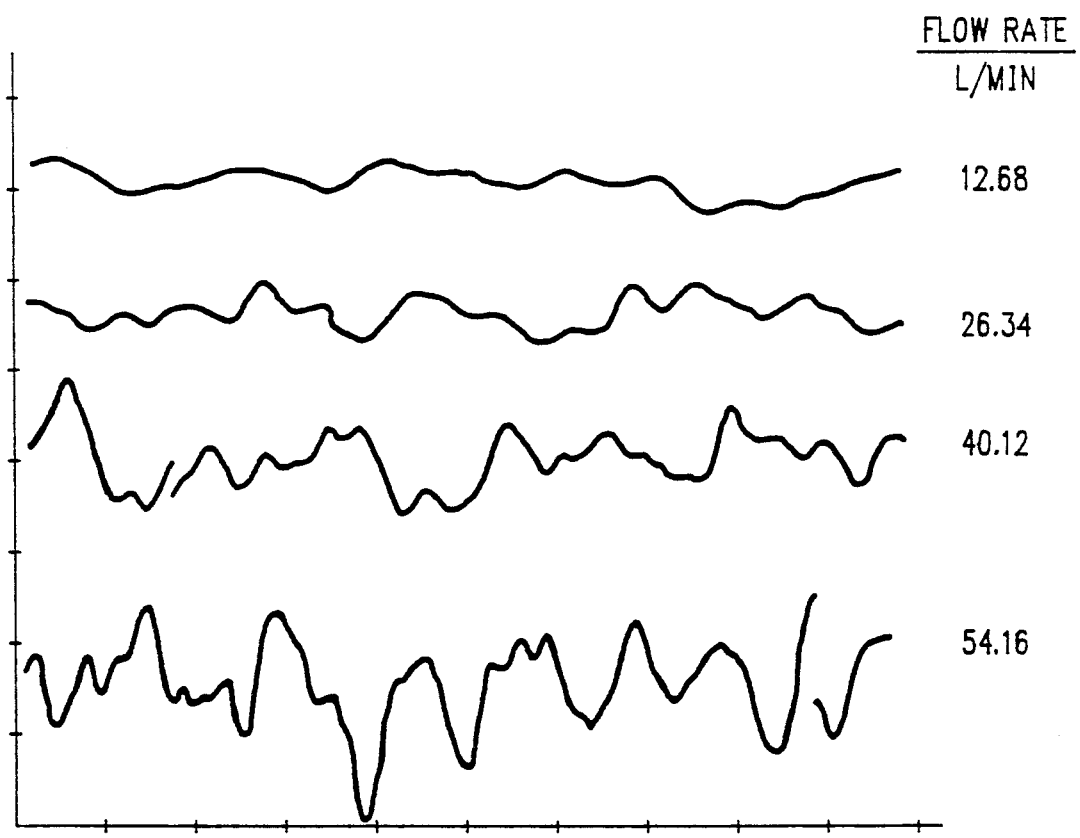
FIG. 4 is a set of waveforms illustrating phase detected demodulated signals obtained according to the invention for different fluid flow rates.

In another experimental system according to the invention, water flow through a conduit having an internal diameter of 1.56 cm was monitored by phase detecting the modulated signal using a circuit of the type shown in FIG. 2. The resulting output voltage waveforms for various flow rates are shown in FIG. 4. As these waveforms suggest, a flow rate indication can be obtained on the basis, for example, of the peak-to-peak, rms, or rectified average voltage value or on the basis of the frequency with which the voltage crosses a selected reference value or the frequency of the voltage peaks, for example by a counting procedure.

As an alternative to the illustrated embodiments, the invention could be implemented using a single transducer in the pulse-echo mode, the transducer emitting a spaced succession of tone bursts or shock-excited pulses and functioning as a receiver during the intervals between bursts or pulses. Transmitted energy will be reflected from the opposite wall of the conduit and modulated by turbulence so that the relative time of reception and amplitude of each received burst or pulse will be varied. The repetition rate of the bursts or pulses can be selected to be significantly higher than the modulation frequency range, so that the modulation behavior will be adequately sampled. Energy in the form of tone bursts or shock-excited pulses can also be used with the two-transducer embodiments.

Moreover, while the embodiments of the invention which have been described above utilize ultrasonic energy, other types of energy which are influenced by turbulence in the fluid could be employed, these including thermal, optical, magnetic, electrical and other suitable forms of energy, appropriate transducers being employed in each case.

The flow velocity measuring technique according to the invention could be applied to any type of fluid which will experience turbulence that varies as a function of flow velocity, such fluids including slurries and two-phase mixtures, as well as any type of gas or liquid.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for monitoring the velocity of flow of a fluid, comprising:

causing fluid to flow through a conduit section defining a monitoring region, the conduit section having an interior defining a flow path which is free of any physical obstruction that can significantly influence fluid flow in the monitoring region;

propagating energy across the flow path in the monitoring region in a direction transverse to the flow path, the energy being selected such that it is modulated by turbulence occurring in the fluid;

detecting the modulated energy at a single location in the monitoring region after the energy has traversed the flow path and generating a single electrical signal representative of the detected modulated energy;

processing the single electrical signal in a manner to provide an indication of the modulation of the energy produced by the turbulence in the fluid;

separately monitoring the velocity of flow of the fluid by a cross-correlation procedure to produce an output signal representative of fluid flow velocity; and combining the output signal with the indication produced by said processing step in order to produce a modified output signal providing a fast response to variations in fluid flow velocity.

2. A method as defined in claim 1 wherein the energy is ultrasonic energy.

3. A method as defined in claim 2 wherein said step of processing comprises measuring the magnitude of the modulation produced by passage of the energy through the fluid.

4. A method as defined in claim 2 wherein said step of processing comprises measuring the frequency of the modulation produced by passage of the energy through the fluid.

5. A method as defined in claim 2 wherein the energy in the beam has an intensity which varies in an alternating manner at a substantially constant frequency, and said step of processing comprises determining the phase relation between the single electrical signal and the energy variations of the unmodulated propagated beam.

6. A method as defined in claim 5 wherein said step of processing comprises providing an indication of the magnitude of variations in the phase relation.

7. A method as defined in claim 5 wherein said step of processing comprises providing an indication of the frequency of variations of the phase relation.

8. Apparatus for monitoring the velocity of flow of a fluid, comprising:
  a conduit section for conducting flowing fluid and defining a monitoring region, the conduit section having an interior defining a flow path which is free of any physical obstruction that can significantly influence fluid flow in the monitoring region;
  means disposed for propagating energy across the flow path in the monitoring region in a direction transverse to the flow path, the energy being selected such that it is modulated by turbulence occurring in the fluid;
  means disposed in the monitoring region for detecting the modulated energy at a single location in the monitoring region after the energy has traversed the flow path and generating a single electrical signal representative of the detected modulated energy;
  circuit means connected to said detecting means for processing the single electrical signal in a manner to provide an indication of the modulation of the energy produced by the turbulence in the fluid;
  cross-correlator means disposed for monitoring the velocity of flow of the fluid by a cross-correlation procedure to produce an output signal representative of fluid flow velocity; and
  means connected for combining the output signal with the indication produced by said circuit means in order to produce a modified output signal providing a fast response to variations in fluid flow velocity.

9. Apparatus as defined in claim 8 wherein the energy is ultrasonic energy.

10. Apparatus as defined in claim 9 wherein said circuit means comprises means for measuring the magnitude of the modulation produced by passage of the energy through the fluid.

11. Apparatus as defined in claim 9 wherein said circuit means comprises means for measuring the frequency of the modulation produced by passage of the energy through the fluid.

12. Apparatus as defined in claim 9 wherein the energy in the beam has an intensity which varies in an alternating manner at a substantially constant frequency, and said circuit means comprises means for determining the phase relation between the single electrical signal and the energy variations of the unmodulated propagated beam.

13. Apparatus as defined in claim 12 wherein said circuit means comprises means for providing an indication of the magnitude of variations in the phase relation.

14. Apparatus as defined in claim 12 wherein said circuit means comprises means for providing an indication of the frequency of variations of the phase relation.

* * * * *